United States Patent [19]
Alley et al.

[11] Patent Number: 5,164,969
[45] Date of Patent: Nov. 17, 1992

[54] PROGRAMMABLE MAX/MIN COUNTER FOR PERFORMANCE ANALYSIS OF COMPUTER SYSTEMS

[75] Inventors: Richard K. Alley; Anthony L. Riccio, Jr., both of Fort Collins, Colo.

[73] Assignee: Hewlett-Packard Company, Palo Alto, Calif.

[21] Appl. No.: 729,095

[22] Filed: Jul. 12, 1991

[51] Int. Cl.[5] .............................................. G03B 23/12
[52] U.S. Cl. .................................................... 377/39
[58] Field of Search ........................................ 377/39

[56] References Cited

U.S. PATENT DOCUMENTS

| | | | |
|---|---|---|---|
| 3,841,456 | 10/1974 | Levasseur | 377/39 |
| 4,001,699 | 1/1977 | Denny et al. | 377/39 |
| 4,016,406 | 4/1977 | Abe et al. | 377/39 |
| 4,255,809 | 3/1981 | Hillman | 377/39 |
| 4,691,330 | 9/1987 | Takahashi et al. | 377/39 |
| 4,780,895 | 10/1988 | Paul | 377/39 |
| 4,870,665 | 9/1989 | Vaughn | 377/39 |
| 4,881,040 | 11/1989 | Vaughn | 377/39 |
| 5,033,066 | 7/1991 | DeVore | 377/39 |

OTHER PUBLICATIONS

Forsyth, et al., "CMOS PA-RISC Processor for a New Family of Workstations," *IEEE COMPCON Spring '91 Digest of Papers, Feb. 1991, pp. 1, 5.*
Mink, et al., "Multiprocessor Performance Measurement Instrumentation," *IEEE Computer Magazine*, Sep. 1990, pp. 66,68.

Primary Examiner—William L. Sikes
Assistant Examiner—Scott A. Ouellette

[57] ABSTRACT

A system and method counts the maximum and minimum number of continuous cycles in which a RISC system event occurs. Additionally, a hold enable input offers the functionality of counting max/min events that are not continuous in time. These maximum and minimum counts are useful for benchmarking performance measurements and for performance debugging. The system and method provides a self-test mode for component testing, as well as maximum, minimum, and accumulator counting modes for use in a programmable performance analysis system. These counting modes allow various aspects of a target system to be categorized for performance analysis. The system has applicability in workstations and RISC systems having high frequency requirements typically greater than 50 Mhz. In one embodiment, a programmable system designed to be utilized in a workstation environment makes use of two identical full speed clock counters and a comparator which are controlled by a PAL that implements a state machine to provide the above four modes of operation.

7 Claims, 7 Drawing Sheets

PROGRAMMABLE MAX/MIN COUNTER FOR PERFORMANCE ANALYSIS OF COMPUTER SYSTEMS

BACKGROUND OF THE INVENTION

1. Field of the Invention

The present invention relates generally to computer systems and, more particularly, to high frequency counters utilized in the performance analysis tests of Reduced Instruction Set Computer (RISC) systems.

2. Related Art

Conventionally, developers of computer systems have made use of hardware tools to conduct tests for analyzing various performance characteristics of a newly developed system. In particular, performance analysis tests are useful when developing a workstation, which can be defined as a computer system that is powerful enough to allow scientific and technical users to obtain the results they require. As this term is used, a workstation can be considered more powerful than the average personal computer that performs word processing and other general business applications, but less powerful than a mini-computer. These performance analyses provide valuable data for the developer to define and to isolate not only strong aspects of the system for exploitation in the marketplace, but also weak aspects of the system for future development and enhancement. Common tests to date include the delay time of the critical path and the number of MIPS (Million Instructions Per Second) that the system can typically provide.

Measuring performance is typically accomplished using either software or hardware tools. Measurements are typically corrupted using software tools because these tools must execute code that is extraneous to the source being measured. As a result, measurements using hardware are preferred because corruption from extraneous code execution is mitigated. However, measurements using hardware tend to be expensive.

The inventors use performance analysis tests in order to determine where a target system is spending its time during operation. This determination is used to fine tune poorly performing components of the target system. Fine tuning to increase poor performance is typically accomplished by modifying target system software or modifying the design of the next generation of the target system.

Although many performance analysis tests are available, the inventors realized that, especially with regard to the high frequency requirements of RISC systems, no tool offers a way of counting the maximum number of continuous cycles in which an event occurs.

Specifically, the inventors realized that no tools existed to count the number of times that the Interrupt bit (I-bit) was used by the CPU. Knowledge of this count would tell the users of the performance analysis tool how long interrupts were disabled during an event occurrence.

The inventors faced the problem of designing a counting solution that could be integrated with larger systems. In particular, they wanted to integrate a counting solution with state-of-the-art high frequency RISC based systems. As such, the inventors desired a counter that would operate in the high frequency environment of these systems.

They wanted a counter that counts the maximum number of continuous cycles that an event is true. However, prior to implementation, the inventors realized that designing a maximum event counter as described would have to be very fast, because current computer systems are performing at 50 Mhz (50,000,000 cycles/second) or faster. Consequently, this speed requirement would most likely mean using a lot of very expensive ECL-based hardware—which is expensive in terms of price, board space and power consumption.

One conventional approach for counting the maximum number of continuous cycles in which a system event occurs includes using a full speed counter in conjunction with a storage register which would be used to store the maximum value. With this alternative, the counter would count when the count enable (CE) goes true. Then, when CE goes false, the value of the counter would be compared to the value stored in the register. If the counter value is larger than the value in the register, then the counter value is stored in the register. Otherwise, if the counter value is less than or equal to the count value in the register, then the value in the register is saved and the counter value is cleared. Therefore, what essentially occurs is: (1) a count is recorded at the end of every string of count enables; (2) the largest of the two values—either the counter or the register—is saved. At the end of the desired time to be counted, the value in the register will be the maximum counting value. This conventional approach counts adequately, but has a few disadvantages.

One disadvantage with this conventional approach is the fact that a high speed path is necessary between the counter and the register. This path requires one high speed connection for each bit between the counter and the register.

Further, the particular design technology may allow the maximum value register to implement the input/output function by allowing the counter values to be loaded/unloaded serially. However, if this implementation is not allowed by the particular design technology, an additional register plus an additional data path to that register would be required.

In addition, a timing problem results from having to be able to perform the count, perform the comparison, transfer the value to the register and then clear the counter for a new count. As a result, a counter and register design could not operate as fast as an alternate design using the same level of technology.

Consequently, a strong need exists in the performance analysis industry for a way of counting the maximum/minimum number of continuous cycles in which a system event occurs that can meet the high frequency requirements of RISC systems.

SUMMARY OF THE INVENTION

The present invention provides a system and method that can be used in computer workstation and RISC system environments to count the maximum and minimum number of continuous cycles in which a system event occurs. These maximum and minimum counts are useful for benchmarking performance measurements and for performance debugging.

The present invention provides a self-test mode for component testing, as well as maximum, minimum, and accumulator counting modes for use in a programmable performance analysis system. These three counting modes allow various aspects of a target computer system to be categorized for performance analysis. Typical performance measurement categories include: max/min time that an interrupt (temporarily halting processor execution to service some request) is disabled; max/min time for servicing an operating system call; max/min instruction cycles executed; max/min instruction cache miss penalty cycles; and, translation lookaside buffer (TLB) misses. Measuring the performance of these aspects of a target system gives a user a "fine grain" view of specifically how the target system is performing. With this view that identifies areas of the design that show poor performance, target system designers are better able to efficiently increase poor performance of the design by modifying target system software or modifying the design of the next generation of the target system.

The present invention has applicability in workstations and RISC systems having high frequency requirements typically greater than 50 MHz. This applicability is necessary to satisfy the high-speed requirements of the target system being measured. Further, the present invention provides a programming capability that enables a user to choose the counting mode, the variable to be counted, and the counting qualification (count by cycle or by event); a hold enable provides the capability of counting max/min events that are not continuous in time.

In accordance with the present invention, the architecture comprises two full speed clock counters, a comparator, and a control PAL that implements a state machine that executes the self-test mode and the maximum, minimum and normal (accumulator) counting modes. The full speed clock counters enable the count values to be compared after every cycle, as is required for max/min counting of cycles. Further, the two counters enable a user to contemporaneously count two independent events. The present invention also allows intermediate counter values to be examined without interfering with the counting. As a result, the present invention provides a system and method with increased flexibility over the conventional approaches that include using a sole counter in conjunction with a storage register.

BRIEF DESCRIPTION OF THE DRAWINGS

The present invention, as defined in the claims, can be better understood with reference to the text and to the following drawings.

DETAILED DESCRIPTION OF THE PREFERRED EMBODIMENTS

Figure 1:
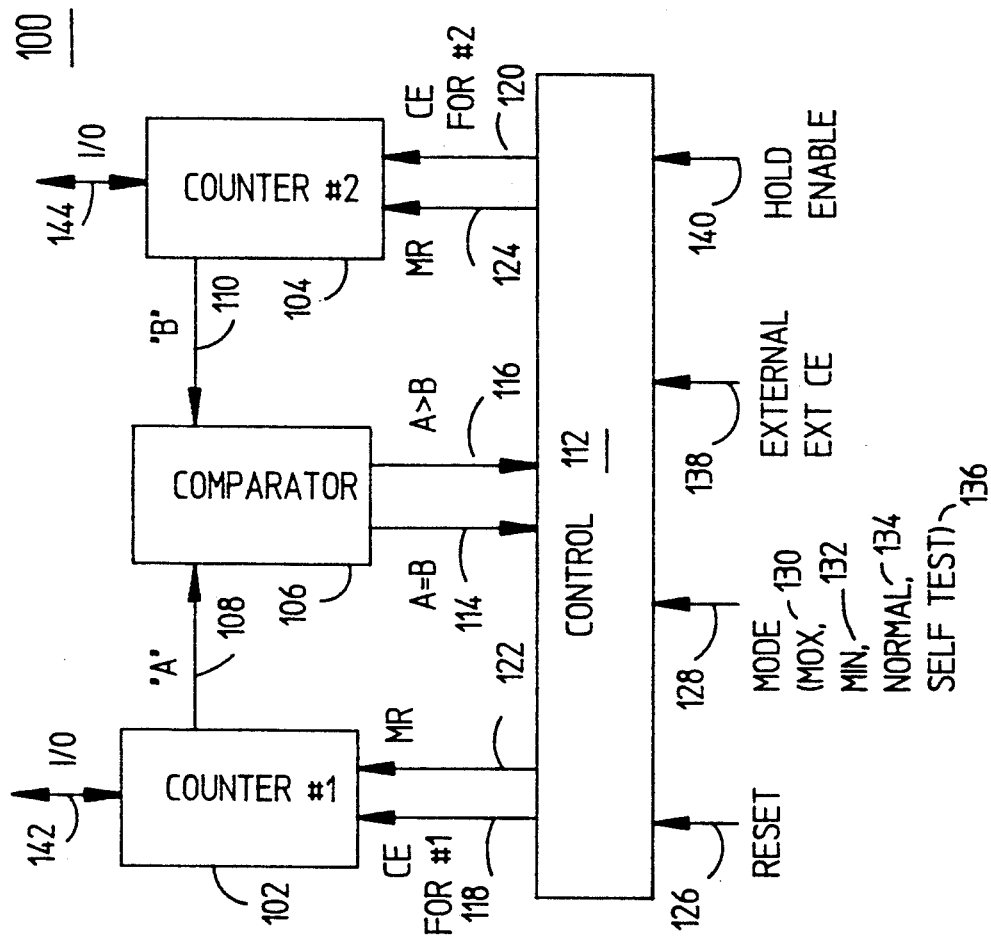
FIG. 1 is a high level block diagram of a preferred embodiment of the computer architecture of the present invention.

The system and method of the present invention has particular applicability in computer systems and methods. In particular, although it has applicability in mainframes (systems generally priced > USD 0.5 million) and mini-computers (multi-user systems generally priced < USD 0.5 million), it also has applicability in workstations, which can be classified as a class of computer that is hierarchically below a minicomputer and above a personal computer. For example, the present invention can be utilized in the workstation described in Forsyth, M., S. Mangelsdorf, E. DeLano, C. Gleason, and D. Steiss, "CMOS PA-RISC Processor for a New Family of Workstations," IEEE COMPCON Spring '91 Digest of Papers, February 1991, which is incorporated by reference herein.

It should be understood however, that the present invention is not limited to a workstation application. Instead, it can be utilized in any computer-based system that requires the capabilities and functionality that the present invention achieves.

The present invention provides a system and method that can be used in computer workstation and RISC system environments to count the maximum and minimum number of continuous cycles in which a system event occurs. These maximum and minimum counts are useful for benchmarking performance measurements and for performance debugging.

The present invention provides a self-test mode for component testing, as well as maximum, minimum, and accumulator counting modes for use in a programmable performance analysis system. These three counting modes allow various aspects of a target computer system to be categorized for performance analysis. Typical performance measurement categories include: max/min time that an interrupt (temporarily halting processor execution to service some request) is disabled; max/min time for servicing an operating system call; max/min instruction cycles executed; max/min instruction cache misses; and, translation lookaside buffer (TLB) misses. Measuring the performance of these aspects of a target system gives a user a "fine grain" view of specifically how the target system is performing. With this view that identifies areas of the design that show poor performance, target system designers are better able to efficiently increase poor performance of the design by modifying target system software or modifying the design of the next generation of the target system.

The present invention has applicability in workstations and RISC systems having high frequency requirements typically greater than 50 MHz. This applicability is necessary to satisfy the high-speed requirements of the target system being measured. The present invention overcomes the deficiencies of the prior art, as noted above, and further provides for the following additional advantages.

First, since the present invention uses multiple counters, a user can contemporaneously count two independent variables. The result is a system and method that provides more features and flexibility than the conventional approach of using a counter in conjunction with a register, which conventional approach permits the contemporaneous counting of only one independent variable.

Second, the present invention provides a hold enable input. This input offers the functionality of counting max/min events that are not continuous in time.

Third, the present invention enables a user to unload the current counts in each counter at any cycle. This capability enables a user to watch the incremental progress of the counters.

In brief, the present invention is a system and method of counting the maximum or minimum number of continuous cycles that it takes for an event to occur in a computer system. The present invention is shown at high level architectural and state perspectives in FIGS. 1, 2 and 3.

Figure 2:
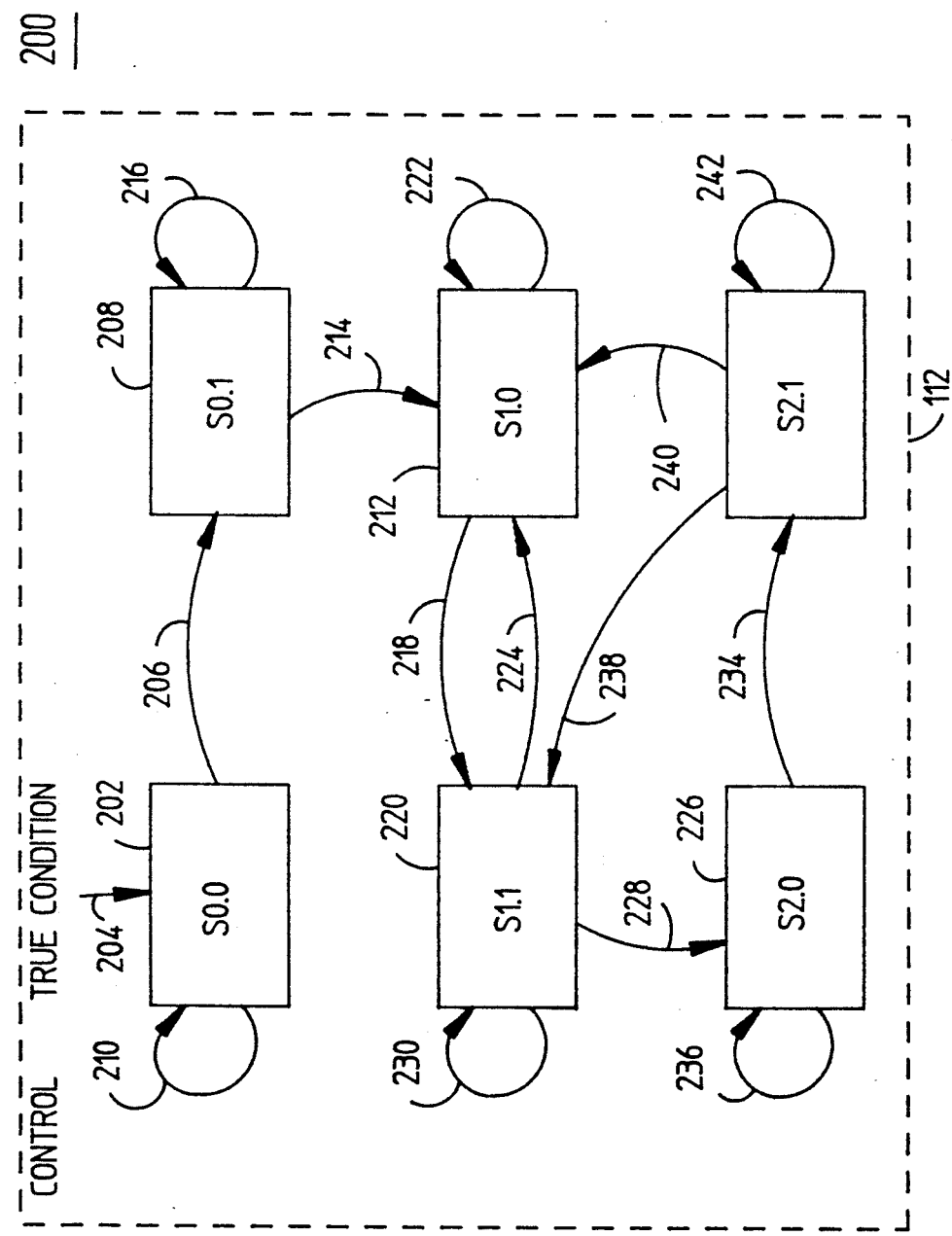
FIG. 2 is a high level state diagram of the six states used to implement the minimum mode 132 of FIG. 1 of the present invention.
Figure 3:
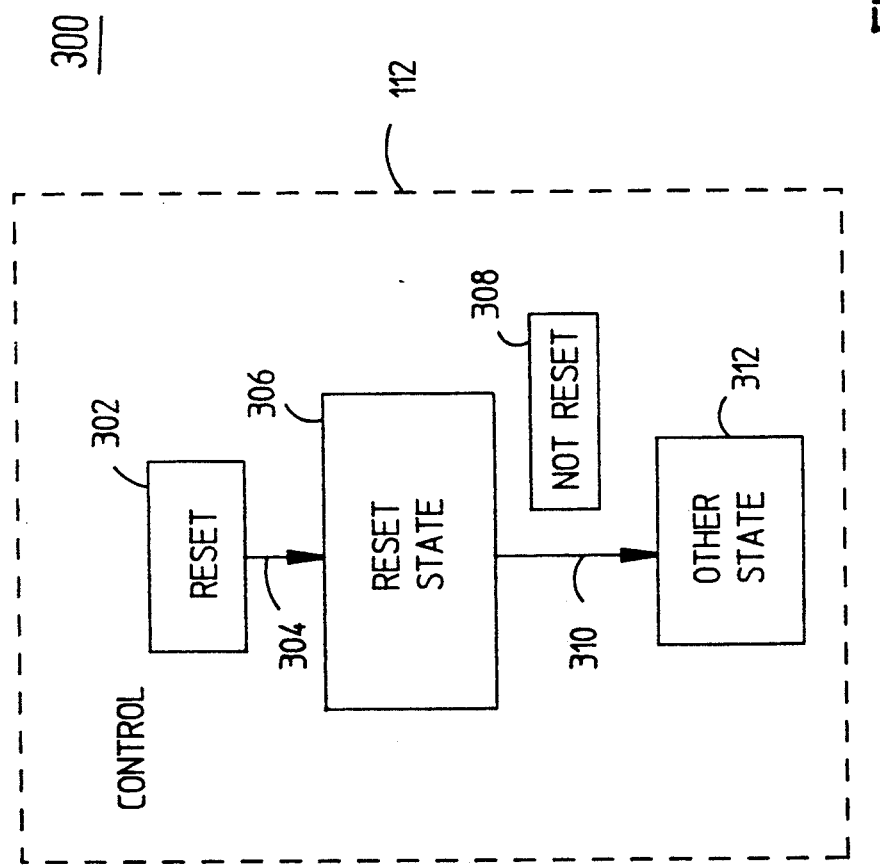
FIG. 3 is a high level state diagram of the reset state and maximum mode and the normal mode used in the implementation of the present invention.

FIG. 1 shows the four basic blocks of the high level architecture of the present invention. FIGS. 2 and 3 shows at a high level an embodiment of a state machine for implementing logic used to control the operational modes of the present invention. Turning now to FIGS. 1, 2 and 3, a counter 102, also called a counter #1, is used to count and store a current value of a chosen independent variable. A counter 104, also called a counter #2, is used to count and store a current value of a chosen independent variable that is different than that being counted by counter #1. A comparator 106, which is connected to counter 102 and counter 104 via a path 108 and a path 110 respectively, is used to compare the value in counter #1 to the value in counter #2 so that the relationship between counter 102 and counter 104 can be precisely known by a control 112.

A path 114 connects comparator 106 to control 112. Path 114 is used by comparator 106 to signal control 112 that the value in counter 102 is equal to the value in counter 104. In addition, a path 116 connects comparator 106 to control 112. Path 116 is used by comparator 106 to signal control 112 that the value in counter 102 is greater than the value in counter 104.

Control 112 requires two out of the three conditions of "greater than, less than, or equal" in order to operate. A preferred embodiment uses "equal" and "greater than." However, any two of these three conditions could be used. Note that given the "equal" and "greater than" conditions, control 112 can, if necessary, determine the third condition, which is the "less than" condition.

Control 112 controls each counter with a count enable (CE), which signals counters 102 and 104 to begin counting, and a master reset (MR), which unconditionally initializes each counter 102 and 104 to a zero count. A path 118 provides the CE from control 112 to counter 102. A path 120 provides the CE from control 112 to counter 104. Likewise, a path 122 provides the MR from the control 112 to counter 102, and a path 124 provides the MR from control 112 to counter 104.

The external inputs to control 112 are as follows:
the reset, illustrated by a path 126, which clears all the counters and resets control 112;
the mode input, illustrated by a path 128, which is actually several bits that specify a mode of operation: a max (maximum) 134, a min (minimum) 136, a normal (accumulator) 138 and self-test 140;
the external count enable (ext_ce) input, illustrated by a path 138, which provides signals to paths 118 and 120; and
the hold enable (hold) input, illustrated by a path 140, which is used to signal when the system should use events instead of cycles as the basis for counting.

Finally, a path 172 provides input/output access for transferring data to and from counter 102; a path 144 provides input/output access for transferring data to and from counter 104.

Control 112 implements a state machine that performs the max 130, min 132, normal 134 and self-test 136 modes of the present invention. In the normal mode 134 of the present invention, each counter 102 and 104 counts when the CE is true, just like the accumulator counters in the main counter array of the integrated workstation described in the article which has been incorporated by reference.

In the self-test mode 136, each n-bit substage of both counters 102 and 104 count together, so that both counters overflow after $2^n$ (where n is an integer greater than or equal to 1) clock cycles. This mode permits counters 102 and 104 to be tested via input/output data paths 142 and 144.

In the max mode 130, counter #1 always counts when CE is true, and always clears when CE is false. Counter #2 counts only when its current count is equal to the current count of counter #1, and CE is true. The comparison of the two counters 102 and 104 is performed by comparator 106. The result in counter #2 is a count of the maximum contiguous cycles that CE is true.

In the min mode 132, the count switches back and forth between counters 102 and 104. When CE is false, the counter 102,104 with the largest value is cleared. This cleared counter 102,104 is used to count the next time the CE comes true. For the case when both counts are zero, the state machine of the present invention uses an extra state and a status bit to keep track of whether the CE was true on the last cycle.

FIG. 2 illustrates with a state diagram the high-level operation of min mode 132. A block 202 represents a state S0.0 and is accessed with an appropriate true condition via a branch 204. Once the specific instructions specified by state S0.0 of this state machine are completed, then the state machine checks conditions specified by a branch 206. If these conditions are satisfied, then the state machine advances to a state S0.1, as illustrated by a block 208. A circular branch ("otherwise" condition) 210 illustrates that if none of the conditions specified by branch 206 are met, then the state machine will repeat the instructions of state S0.0 and wait another cycle to recheck conditions on branch 206 again. This process is repeated indefinitely until the state machine advances to a state S0.1, as illustrated by a block 208.

Once in state S0.1, the state machine checks for conditions specified by a branch 214. If these conditions are satisfied, then the machine advances to a state S1.0, as illustrated by a block 212. If branch 214 conditions are not met, then the state machine follows the "otherwise" conditions specified by a branch 216 and repeats the instructions specified by state S0.1 for another cycle.

Once in state S1.0, the machine checks for conditions specified by a branch 218. If these conditions are satisfied, then the machine advances to a state S1.1, as illustrated by a block 220. Otherwise, a branch 222 illustrates that state S1.0 is repeated for another cycle.

In state S1.1, the state machine advances back to state S1.0 upon meeting the conditions specified in a branch 224. In the alternative, the state machine advances to a state S2.0, as illustrated by a block 226, upon meeting conditions specified by a branch 228. Otherwise, a branch 230 illustrates that the instructions in state S1.1 are repeated for another cycle.

In state S2.0, the state machine advances to a state S2.1, as illustrated by a block 232, upon meeting conditions specified by a branch 234. Otherwise, a branch 236 illustrates that the instructions in state S2.0 are repeated for another cycle.

Finally, in state 2.1, the state machine advances to state S1.1 upon meeting conditions specified by a branch 238 or advances to state S1.0 upon meeting conditions specified by a branch 240. Otherwise, a branch 242 illustrates that the instructions in state 2.1 are repeated for another cycle.

Figure 4:
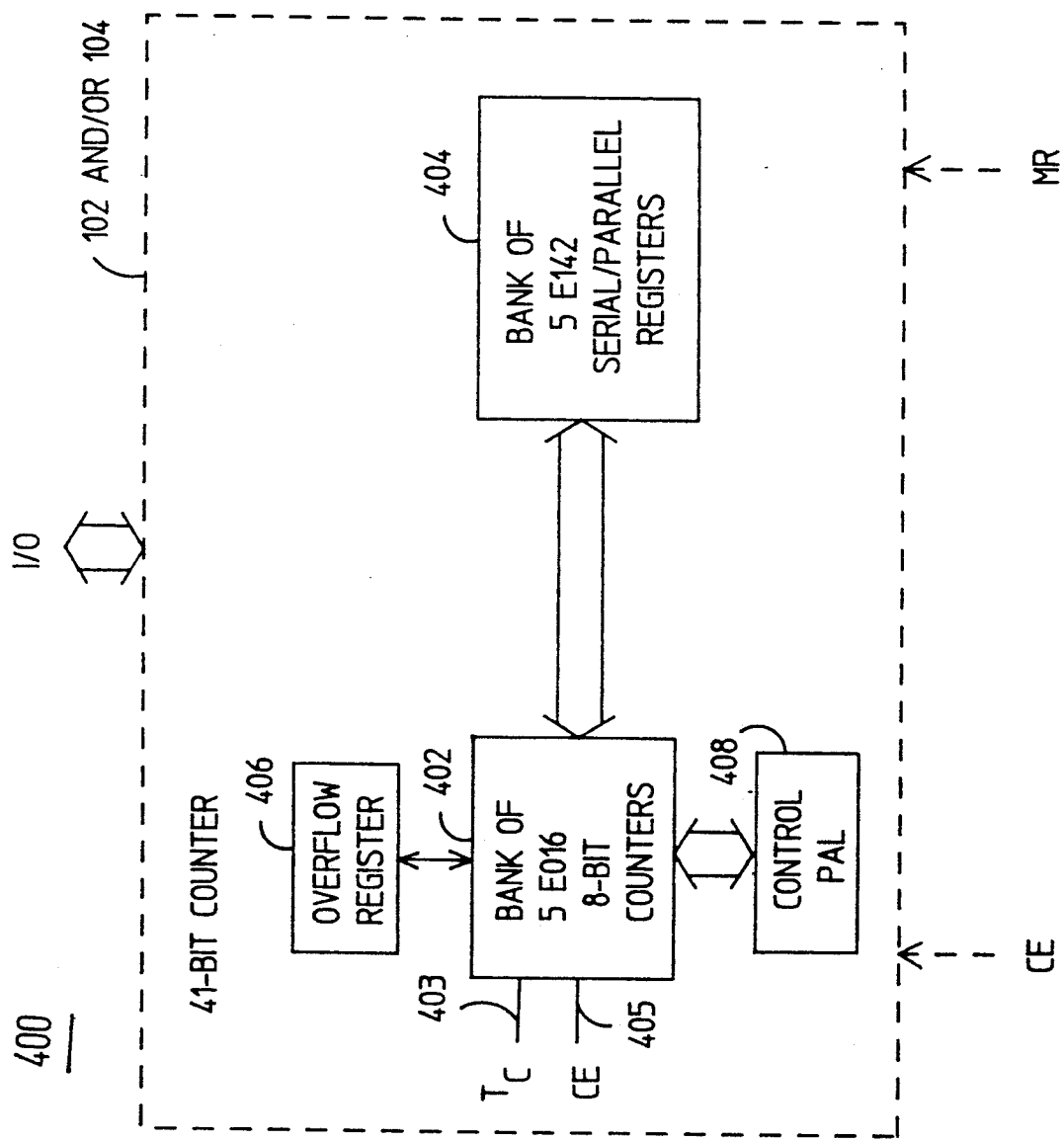
FIG. 4 is a block diagram of a 41 bit counter embodiment of counter 102 and/or counter 104 of FIG. 1 of the present invention.
Figure 5:
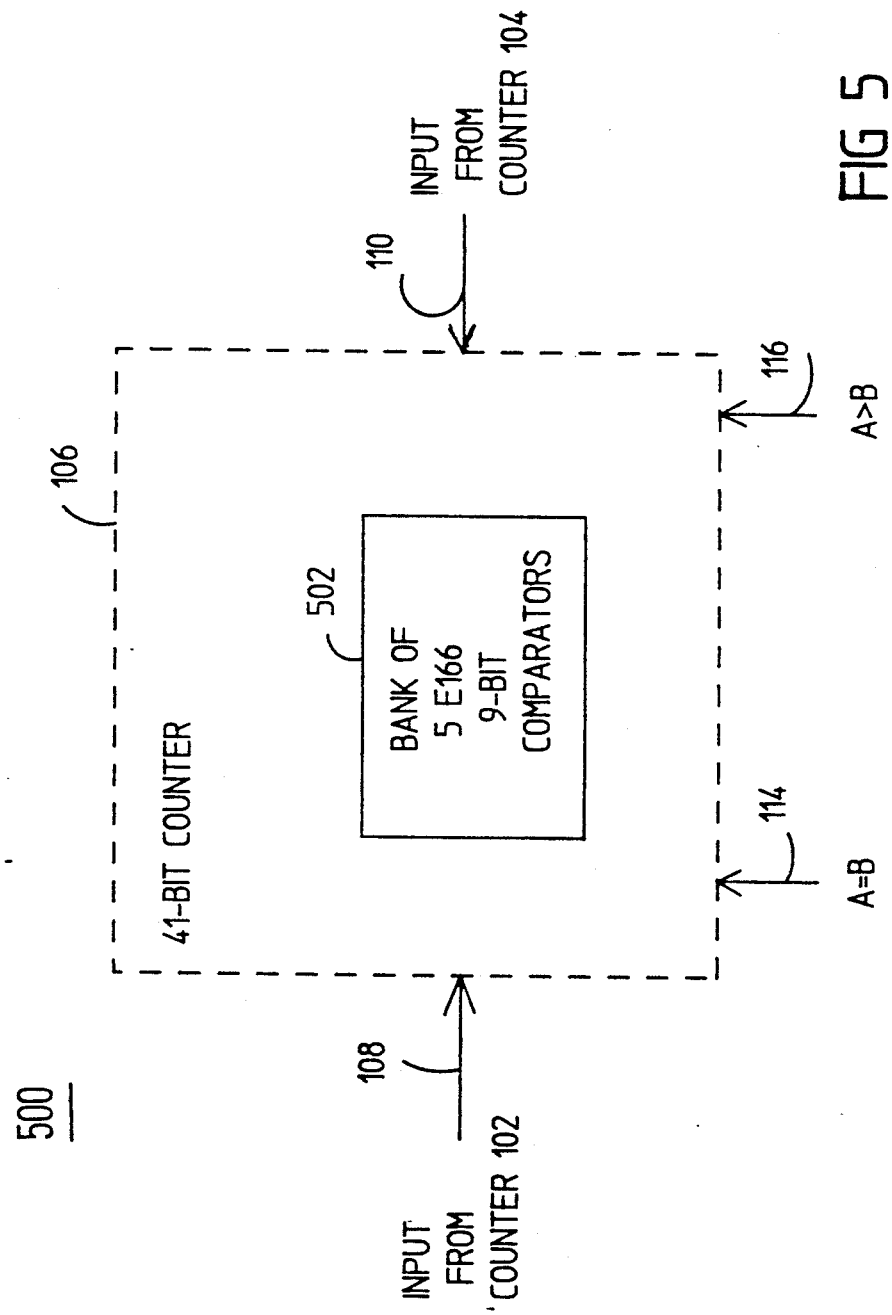
FIG. 5 is a block diagram of the 41 bit comparator embodiment of comparator 106 of FIG. 1.
Figure 6:
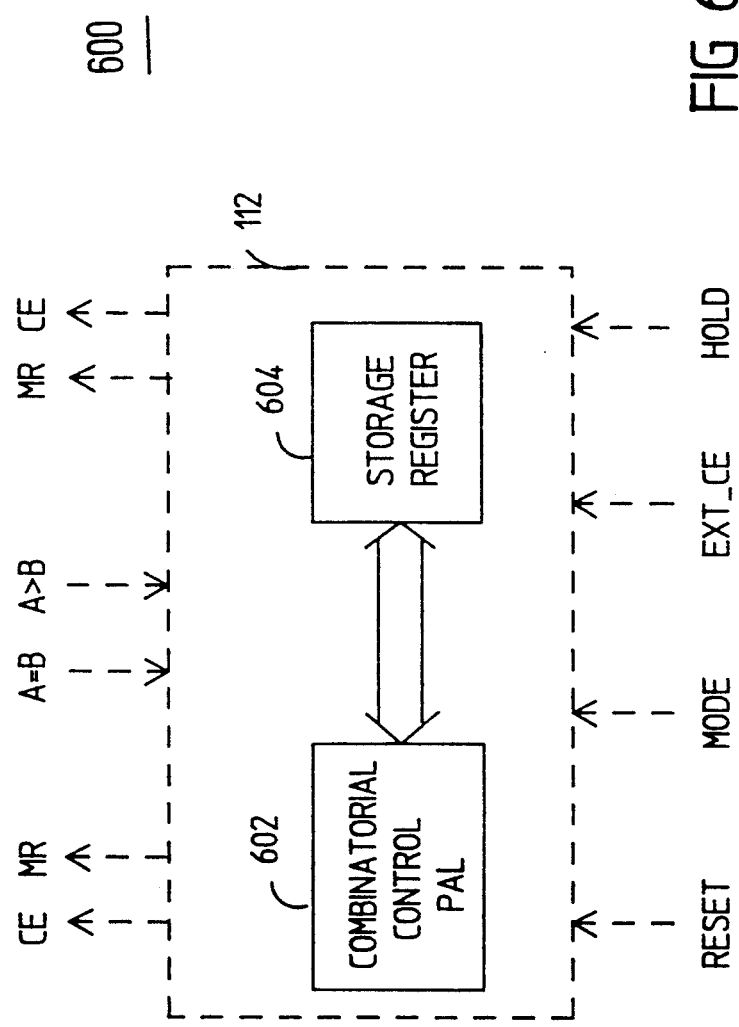
FIG. 6 is a block diagram of the control block embodiment of control 112 of FIG. 1.

FIG. 3 illustrates with a high-level state diagram the operation of the max 130 and normal 134 modes of the present invention. In these modes, anytime a condition 302 is encountered, which is a "reset is true" condition, the state machine of the present invention advances along a branch 304 to a block 306, which block 306 represents the reset state. The state machine remains in this reset state until it encounters a condition 308, which is a "reset is false" condition. When condition 308 is satisfied, the state machine advances along a branch 310 to a block 312. This block 312 is some state other than the reset state. In particular, this other state could be a state for the max 130 or normal 134 mode. A preferred embodiment of the present invention is shown in FIGS. 4 through 7. Specifically, FIGS. 4, 5 and 6 show an architectural implementation of the counter 102 or 104, the comparator 106, and the control 112 respectively.

Referring now to FIG. 4, block 102 is implemented as a 41-bit counter which is made up of four blocks. A block 402 includes a bank of 5 Motorola 10E016 8-bit counters which are connected via input/output data lines to:

a block 404, which represents a bank of 5 Motorola 10E142 serial/parallel registers 404;

a block 406, which represents an overflow register 406; and a block 408, which represents a control block that is implemented with control logic using programmable array logic (PAL) 408.

Each 8-bit counter in block 402 has a TC 403 (Terminal Count) and a CE 405 (Count Enable). When the CE 405 is true, the 8-bit counter counts up. When the counter is about to overflow, the TC 403 comes true to signal the 8-bit counter which is next in line to count.

The function of control PAL 408 is to combine the terminal counts and the external CE to produce the CEs for the individual 8-bit counters 402 so that they function together as a single 40-bit counter. The 41st bit (which is a sticky (stabilized) overflow: once set, it stays true until reset) is implemented by using a single bit of an 8-bit register. The end result of this hardware implementation is a "subsystem" with a single CE that is a 40-bit counter with a 1-bit sticky (stabilized) overflow.

The bank of serial/parallel registers 404 are used for loading/unloading the counter values. An advantage to using multiple counters is that the counter values can be unloaded at will. Therefore, if necessary, a user can watch the incremental progress of either counter. This advantage can be distinguished over the conventional solution of using a counter in conjunction with a register. With the conventional solution, the counter value cannot be accessed until counting is completed.

It is important to note that although a 41-bit counter is implemented in the preferred embodiment, the maximum 130 mode of the present invention could be implemented with counters consisting of any number of bits. In addition, neither the fact that the counter is built from smaller counters nor the means of loading/unloading the counters affects the function of the present invention. The relevant aspect is that these counters are not ripple counters, but are full clock-speed counters. This aspect of the present invention enables the correct count to always be available at the start of the next clock cycle.

FIG. 5 shows a preferred embodiment of block 106 as a 41-bit comparator. This comparator is illustrated by a block 502 showing a bank of 5 Motorola 10E166 9-bit comparators. These 9-bit comparators are connected together to act as a single 41-bit comparator. The count values of counters 102 and 104 are inputted via paths 108 and 110 to this comparator 106. The exact implementation of this 41-bit comparator is not critical to the function of the maximum/minimum counter. What is needed is for the comparator block 502 to generate at least two of the possible three conditions (greater than, equal to, less than), so that the relationship between counters 102 and 104 can be sent from comparator 106 to the control 112 and, if necessary, used to determine the third of the three conditions.

FIG. 6 shows a preferred embodiment where control 112 includes two blocks 602 and 604. Block 602 is a combinatorial control PAL that implements the state machine described at a high level in FIGS. 2 and 3. This PAL has a data path to and from a block 604, which is a Motorola 10E142 latch 604. Latch 604 is used to store the current state of control 112. All of the control bits from block 602 and the state bits from block 604 are scannable, including the outputs of the comparator 106 array. This feature enables a user to more readily test each component of the system.

Figure 7:
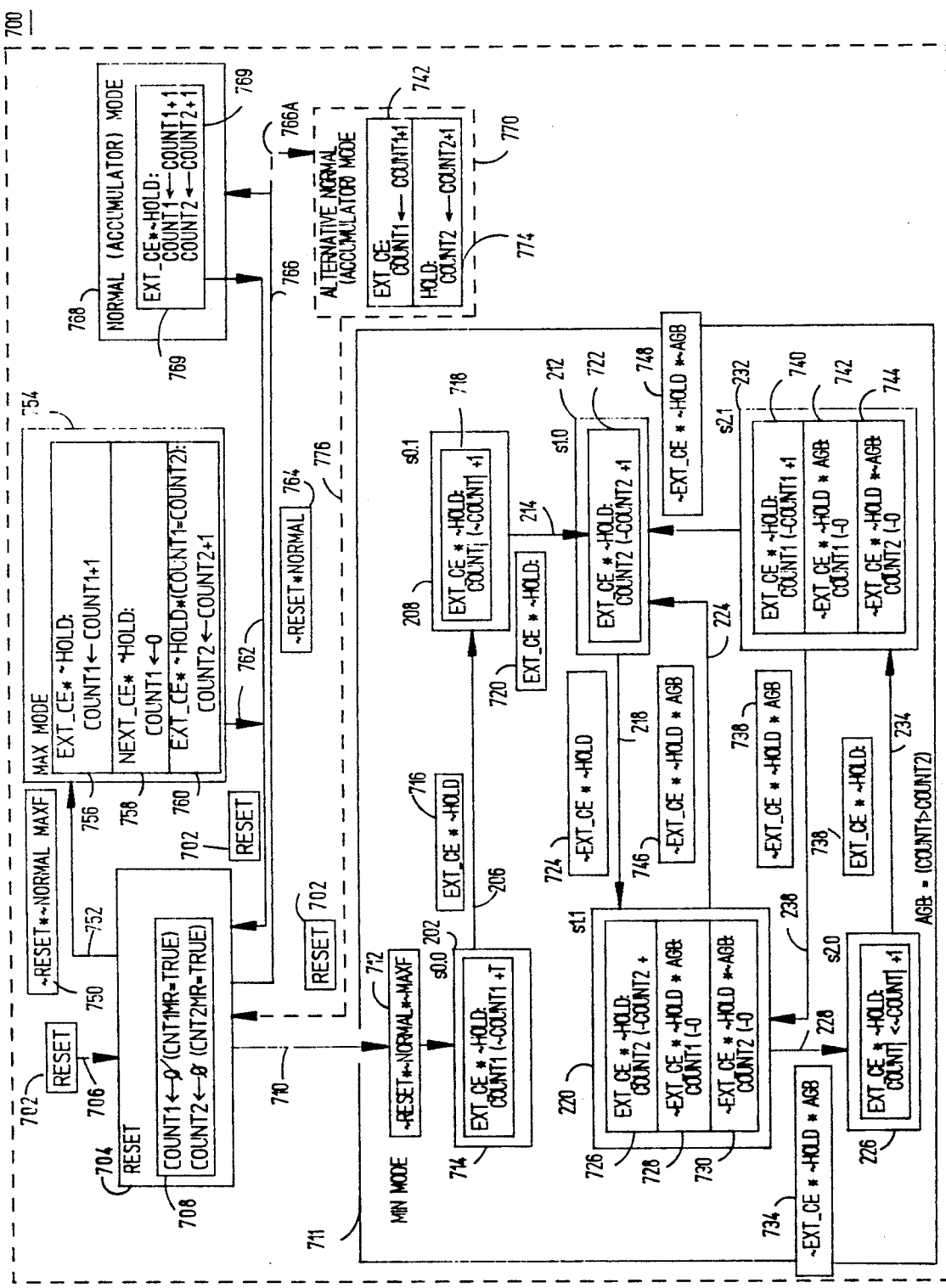
FIG. 7 is a state diagram of an embodiment of the state machine implemented in control 112 of FIG. 1, which comprises the reset 704, the minimum mode 711, the maximum mode 754, and the normal (accumulator) mode 768 or the alternative normal mode 770 of FIG. 7.

FIG. 7 depicts the operation of the state machine implemented in control 112. Referring to FIG. 7 and following the conventions used to describe the state diagrams illustrated in the description of FIGS. 2 and 3, the description starts with a condition 702. This condition is the initial reset condition required to advance to a block 704 via a branch 706. When condition 702, which reads "reset is true," is satisfied, the state machine advances to the Reset state, as illustrated by block 704. It then executes an instruction 708, which specifies to unconditionally:

set the value of counter #1 to 0 by setting the master reset for counter #1 (CNT1MR) to true;

set the value of counter #2 to 0 by setting the master reset for counter #2 (CNT2MR) to true.

The state machine of the present invention will remain in this block 704 until it encounters some condition "other than reset," as illustrated by condition 308.

Note a branch 710, which is followed by the state machine upon satisfying condition 712. Condition 712 calls for a logical ANDing of three inputs, namely, reset, normal and maxF. The tilde (~) used in FIG. 7 is used to represent the inverse of the signal immediately following the tilde. In the present embodiment using condition 712, tilde reset refers to the inverse of whatever reset is. Generally, for a condition to be met, a desired input is required to be true; when a tilde input is specified, the desired input is required to be false. Therefore, in this embodiment, a tilde reset would be a condition requiring that reset be false so that tilde reset would be true (the inverse of false). Furthermore, the asterisk (*) in FIG. 7 is used to represent the logical ANDing of two signals. In the present embodiment, the input specified by condition 712 would specifically be calling for the inverse of reset and the inverse of normal and the inverse of maxF. An appropriate way to interpret this condition is to read it as follows: condition 712 is calling for the condition when reset is false AND normal is false AND maxF is false.

Referring to the above interpretation, when a condition 712 occurs, the state machine advances from block 708, along a branch 710, into block 711, which is the implementation for the minimum 132 mode of control 112, to state S0.0, represented by block 202. An instruction 714 illustrates the instruction called for by state S0.0. Specifically, instruction 714 instructs that when the input external CE (ext_ce) is true AND hold is false, then increment the counter #1 by one binary (base-2) value. Note that this instruction adds 1 to the counter 102 so that counter 102 can count the fact that the state machine of the present invention has just completed a cycle which has been counted. Next, the state machine looks to the condition specified by condition 716. Condition 716 reads when ext_ce is true AND hold is false, then follow path 206 to advance to state S0.1, as illustrated by block 208. For simplicity, branch 210 is not shown on FIG. 7, but as described in the description of FIG. 2, if the condition specified by condition 716 is not met, then the state machine advances itself to state S0.0 for the next cycle. With such an advancement, counter 102 will again be incremented by one, and counter 102 will reflect the fact that the state machine of the present invention has been idle through two cycles.

In state S0.1, instruction 718 instructs that when ext_ce is true AND hold is false during a checked cycle, then increment counter #1 by 1. When a condition 720 is met, the state machine advances, as illustrated by branch 214, from state S0.1 to state S1.0 illustrated by block 212. In state S1.0, the counter #2, illustrated by block 104, is incremented by 1 when ext_ce is true AND hold is false, as illustrated by an instruction 722. At the start of the next cycle, the state machine looks to condition 724 which specifies that ext_ce is true AND hold is false. If this condition 724 is met, the state machine advances along branch 218 to state S1.1 illustrated by block 220. If condition 724 is not met, the state machine repeats the instruction 722, and again increments count 2 by 1.

In state S1.1, as indicated by block 220, the state machine has a possibility of three instructions. Instruction 726 indicates that if ext_ce is true AND hold is false, then increment by 1 counter #2. Instruction 728 indicates that if ext_ce is false AND hold is false AND counter #1 is greater than counter #2, then reset to 0 counter #1. Finally, instruction 730 illustrates that if ext_ce is false AND hold is false AND counter #1 is not greater than counter #2, then reset to 0 counter #2.

At the start of the next cycle, the state machine checks a condition 732, which specifies that if ext_ce is false AND hold is false, and the value of counter number 1 is not greater than the value of counter number 2, then advance along branch 224 back to state S1.0 illustrated by block 212 and then perform the instruction stated there. Likewise, the state machine also checks a condition 734, which specifies that if ext_ce is false and hold is false and the value in counter #1 is greater than the value in counter #2, then advance along branch 228 to state S2.0, illustrated by block 226, and then perform the instruction found there. If neither conditions 732 nor 734 are met, the state machine repeats the instructions 726, 728 and 730 found in state S1.1 for that cycle.

In state S2.0, the state machine executes instruction 736 which specifies that if ext_ce is true hold is false, then increment by 1 the value in counter #1. At the beginning of the next cycle, the state machine checks a condition 738, which specifies that if ext_ce is true AND hold is false, then advance along branch 234 to state S2.1, as illustrated by block 232. If condition 738 is not met, then the state machine remains in state S2.0, repeats instruction 736, and waits until the next cycle to repeat the sequence just described for state S2.0.

In state S2.1, the state machine has three instructions 740, 742, and 744 to execute. Instruction 740 specifies that if ext_ce is true AND hold is false, then increment by 1 the value of counter #1. Instruction 742 specifies that if ext_ce is false AND hold is false and counter #1 is greater than counter #2, then reset to 0 the value in counter #1. Instruction 744 specifies that if ext_ce is false AND hold is false AND counter number 1 is greater than counter number 2, then reset to 0 the value found in counter #2. At the beginning of the next cycle, the state machine checks condition 746, which specifies that if ext_ce is false AND hold is false AND the value in counter #1 is greater than the value found in counter #2, then advance along branch 238 to state S1.1, illustrated by block 220, and then execute the instructions found there. Likewise, the state machine checks a condition 748, which specifies that if ext_ce is false AND hold is false AND the value found in counter #1 is not greater than the value found in counter #2, then advance along the path specified by path 240 to state S1.0, illustrated by block 212, and then execute the instruction found there. Finally, if neither condition 746 nor condition 748 is met, then remain in state S2.1, repeat instructions 740, 742 and 744, and wait until the next cycle to repeat the sequence just described for state S2.1. The state machine remains in this minimum mode until it encounters a reset condition, specified by condition 702, at which point the state machine unconditionally advances to the reset mode, as illustrated by block 704.

When the state machine is waiting in the reset state 704 of the present invention, if reset is false AND normal is false AND maxF is true (condition 750), then the state machine will advance along branch 752 to the maximum 130 mode, illustrated by block 754.

In maximum mode block 754, the state machine has instructions 756, 758, and 760 to execute. Instruction 756 specifies that if ext_ce is true AND hold is false, then increment by 1 the value of counter #1. Instruction 758 specifies that if ext_ce is false AND hold is false, then reset to 0 the value found in counter #2. Instruction 760 specifies that if ext_ce is true AND hold is false AND the value in counter number 1 is equal to the value in counter #2, then increment by 1 the value of counter #2. A branch 762 out of block 754 illustrates that until condition 702 is met, the state machine remains in this maximum mode for each cycle and execute the instructions found in block 754.

When the state machine of the present invention is waiting in the reset state 704, if reset is false AND normal is false (condition 764), then the state machine of the present invention will advance along a branch 766 to the normal (accumulator) 134 mode, as illustrated by block 768.

In normal (accumulator) mode block 768, instruction 769 specifies that if ext_ce is true AND hold is false, then increment by 1 the value of counter #1 and increment by 1 the value of counter #2. Branch 762 out of block 768 illustrates as in max mode block 754, that until condition 702 is met, the state machine of the present invention remains in this normal mode 768 for each cycle and repeats the instructions found in block 768.

As an alternative to block 768, when condition 764 is met, the state machine could alternatively be implemented to advance along a branch 766a, which is illustrated as a dashed branch off of solid path 766.

Branch 766a illustrates that the state machine of the present invention advances to the alternative normal (accumulator) mode block 770, as illustrated by dashed block 770.

Block 770 has instructions 772 and 774 to execute. Instruction 772 instructs that if ext_ce 138 is true, then increment by 1 the value of counter #1. Instruction 774 instructs that if hold 140 is true, then increment by 1 the value of counter #2. A dashed branch 776 out of block 770 illustrates that until condition 702 is met, the state machine of the present invention remains in this normal mode block 770 for each cycle and repeats the instructions found in block 770.

As has been described, the present invention is implemented in hardware. However, it should be understood that it could be implemented in software or with a combination of hardware and software.

The foregoing description of the preferred embodiment of the present invention has been presented for purposes of illustration and description. It is not intended to be exhaustive or limit the present invention to the precise form disclosed, and obviously many modifications and variations are possible in light of the above teachings.

The preferred embodiment was chosen and described in order to best explain the principles of the present invention and its practical application to those persons skilled in the art and to thereby enable those persons skilled in the art to best utilize the present invention in various embodiments and with various modifications as are suited to the particular use contemplated. It is intended that the scope of the present invention be broadly defined by the claims.

What is claimed is:

1. A system for counting a number of events which occur in a computer comprising:
   (a) a first counter which produces a first event count;
   (b) a second counter which produces a second event count;
   (c) a comparator comprising:
      (i) a first input for receiving a first event count from said first counter;
      (ii) a second input for receiving a second count event from said second counter;
      (iii) an output for indicating a relationship between said first and second event count; and
   (d) a controller for receiving said output from said comparator and implementing a state machine, wherein said state machine provides one of a maximum, minimum or normal counting modes of operation for counting the number of system events.

2. The system of claim 1, wherein one of said modes further comprises:
   (a) a self-test mode for checking for correct operation of said counters;
   (b) a self-test mode for checking for correct operation of said comparator; and
   (c) a self-test mode for checking for correct operation of said state machine.

3. A method for counting a maximum number of consecutive events occurring in a computer, comprising the steps of:
   (a) setting a count enable signal to true when a predetermined event occurs within a specified time period;
   (b) setting the count enable signal to false when the event does not occur within a specified time period;
   (c) incrementing a first counter when said count enable signal is true;
   (d) clearing the first counter to a zero value when said count enable signal is false;
   (e) incrementing a second counter for counting a maximum number of consecutive events when said second counter contains a value equivalent to a current value of said first counter when said count enable is true; and
   (f) holding said second counter to its current value when said second counter contains a value equivalent to a current value of said first counter when said count enable is false.

4. A method for counting a minimum number of consecutive events which occur in a computer comprising the steps of:
   (a) counting with a first counter a number of events in a first continuous stream of events;
   (b) counting with a second counter a number of events in a second continuous stream of events;
   (c) comparing values of said first counter and said second counter to determine a larger value;
   (d) clearing the counter containing the larger value;
   (e) counting the number of events in a next continuous stream of events with the previously cleared counter;
   (f) repeating steps (c), (d) and (e) until counting of events is completed;
   (g) comparing the values of said first counter and said second counter to determine a smaller value;
   (h) selecting the smaller value as a final minimum count of the number of consecutive events.

5. A method of counting bursts of consecutive events that are not continuous in time in a computer comprising the steps of:
   (a) setting a count enable to true when an event occurs, and setting said count enable to false when said event does not occur during a specified time period;
   (b) setting a hold enable to true when said count enable is to be ignored, and setting said hold enable to false when said count enable is not to be ignored;
   (c) incrementing a first counter when said count enable is true and said hold enable is false; and
   (d) retaining said first counter at its current value when said hold enable is true.

6. A method for counting as in claim 5 further comprising the steps of:
   (e) clearing said first counter to a zero value when said count enable is false and said hold enable is false;
   (f) counting a maximum number of consecutive events by incrementing a second counter when a current value of said second counter is equal to a current value of said first counter, when said count enable is true and said hold enable is false;
   (g) retaining said second counter at its current value when any one of the following set of conditions exist:

(i) said count enable is false;
(ii) the value of said first counter is not equal to the value of the second counter; or
(iii) said hold enable is true.

7. A method for counting as in claim 5, further comprising the steps of:
  (e) counting a minimum number of consecutive events by incrementing a second counter when:
    (i) a current value of said second counter is equal to a current value of said first counter,
    (ii) when the count enable is true, and
    (iii) the hold enable is false;
  (f) retaining said second counter at its current value when any one of the following set of conditions exist:
    (i) said count enable is false;
    (ii) the value of said first counter is not equal to the value of the second counter; or
    (iii) said hold enable is true.
  (g) comparing the values of said first counter and said second counter to determine a larger value;
  (h) clearing the counter which has the larger value;
  (i) counting with the newly cleared counter a number of events in a next stream of events;
  (j) repeating steps (g)–(i) until counting is completed;
  (k) comparing values of said first counter and said second counter to determine which is smaller; and
  (l) selecting the smaller counter value as a final minimum count of consecutive events.

* * * * *